United States Patent
Modest

(10) Patent No.: US 7,391,203 B2
(45) Date of Patent: Jun. 24, 2008

(54) MAGNETIC FIELD SENSOR

(75) Inventor: Otmar Modest, Teningen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/571,927

(22) PCT Filed: Aug. 20, 2004

(86) PCT No.: PCT/EP2004/051867

§ 371 (c)(1),
(2), (4) Date: Mar. 15, 2006

(87) PCT Pub. No.: WO2005/031371

PCT Pub. Date: Apr. 7, 2005

(65) Prior Publication Data

US 2007/0063693 A1    Mar. 22, 2007

(30) Foreign Application Priority Data

Sep. 26, 2003    (DE) .................. 103 45 049

(51) Int. Cl.
*G01B 7/14* (2006.01)
*G01B 7/30* (2006.01)
(52) U.S. Cl. .................. 324/207.2; 324/207.25
(58) Field of Classification Search .............. 324/207.2,
324/207.25, 173, 174, 228, 251; 310/152,
310/306, 309; 332/146; 73/519.01
See application file for complete search history.

(56) References Cited

U.S. PATENT DOCUMENTS 5,416,410 A    5/1995    Kastler 6,291,990 B1    9/2001    Nakane et al.
2003/0112158 A1    6/2003    Babin

FOREIGN PATENT DOCUMENTS

| DE | 36 38 622 A1 | 5/1988 |
|---|---|---|
| DE | 295 16 373 U1 | 1/1996 |
| DE | 195 46 865 C1 | 10/1996 |
| DE | 198 32 111 A1 | 2/1999 |
| DE | 100 39 588 A1 | 7/2001 |
| DE | 101 46 157 A1 | 4/2002 |
| GB | 2 328 284 A | 2/1999 |
| WO | WO9708716 | * 3/1997 |

OTHER PUBLICATIONS

Derwent Abstract—DE 101 46 157 A1; Apr. 4, 2002; Manitz Finsterwald & Partner GbR, D-80336 München, Germany.
Derwent Abstract—DE 36 38 622 A1; May 26,1988; Mannesmann Kienzle GmbH, D-7730 Villingen-Schwenningen, Germany.
Derwent Abstract—DE 195 46 865 C1; Oct. 2, 1998; VDO Adolf Schindling AG, D, D-80326 Frankfurt, Germany.
Derwent Abstract—DE 100 39 588 A1; Jul. 5, 2001; AB Elektronik GmbH, D-59368 Werne, Germany.
Derwent Abstract—DE 198 32 111 A1; Feb. 4, 1999; Mannesmann VDO AG, D-60388 Frankfurt, Germany.

* cited by examiner

*Primary Examiner*—Reena Aurora

(57) ABSTRACT

A magnetic field sensor for measuring the rotational speed of a rotating gear component is disclosed. The sensor includes a Hall probe, at least one permanent magnet and housing. The Hall probe is arranged in the influence area of the magnetic field of the permanent magnet. The intent is to produce the magnetic field sensor in a less complex manner. This is achieved by virtue of the fact that the permanent magnet is secured to the housing. One particular advantage of the device is that it is extraordinarily robust and is only slightly sensitive to vibrations.

10 Claims, 1 Drawing Sheet

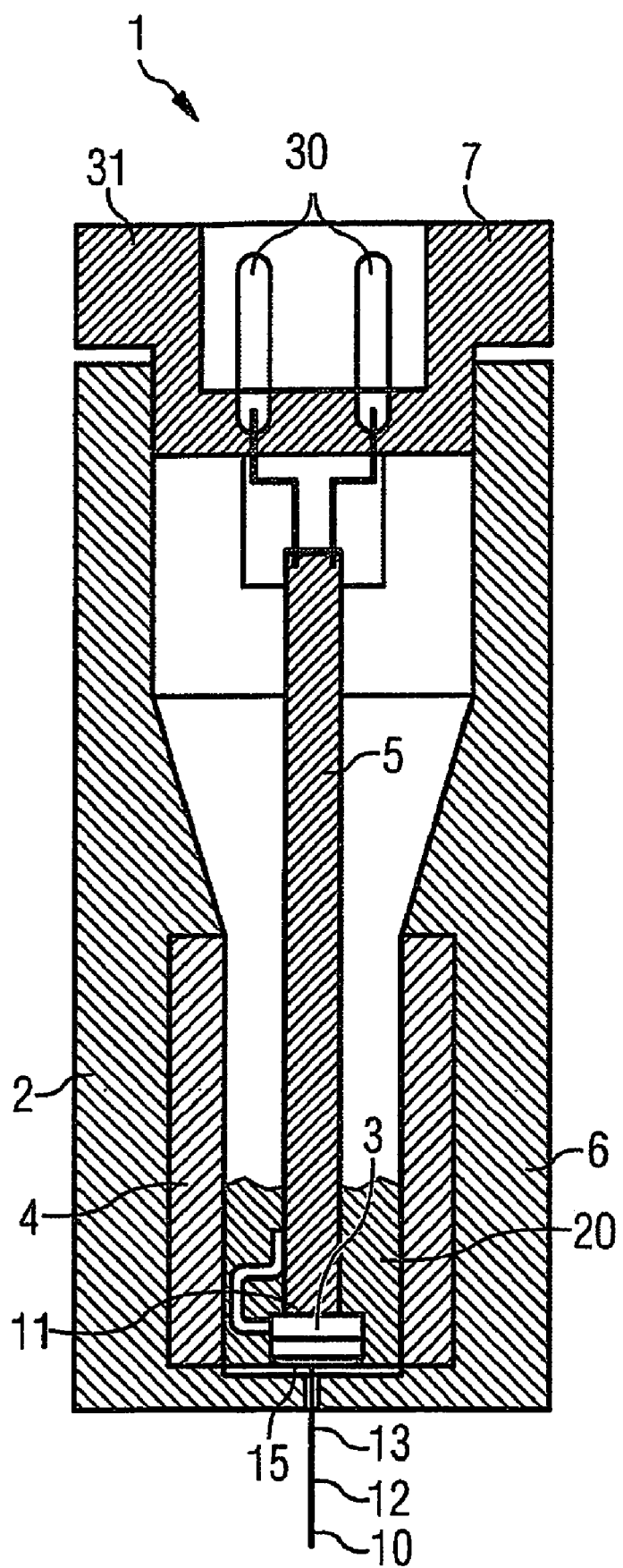

MAGNETIC FIELD SENSOR

BACKGROUND OF THE INVENTION

The invention relates to a magnetic field sensor, in particular for measurement of the rotation speed of a rotating transmission component, having a Hall probe having at least one permanent magnet, with the Hall probe being located in the area of influence of the magnetic field of the permanent magnet, having a housing which surrounds the Hall probe, wherein the permanent magnet is attached to the housing, wherein the housing is at least partially composed of plastic and the permanent magnet is in the form of a ring or hollow cylinder, wherein the longitudinal axis of the permanent magnet and an induction axis of the Hall sensor essentially coincide, with the induction axis being oriented at right angles to the electrical field direction of the Hall voltage and to the electrical main current direction in the Hall probe.

Magnetic field sensors of the type mentioned above are preferably used for rotation speed monitoring in goods vehicles, because the signal transmitters, in which field plates or Hall generators are used as active elements, have the advantage over induction transmitters that it is possible to detect relatively low rotation speeds or movements in the stationary range. In addition to being used for rotation speed measurement in a motor vehicle transmission, magnetic field sensors according to the invention can also be used to monitor other movements, for example rotary movements or translations.

A magnetic field sensor of a conventional type is already known from EP 0 546 355 B1. The extraordinarily accurate operation of this component can be achieved only on the basis of a highly complex manufacturing and assembly process. The large number of work steps include, inter alia, the attachment of the permanent magnet to a holder which has a push fit with the permanent magnet, by means of a UV-curing adhesive following previous accurate adjustment of the position of the Hall probe with respect to the permanent magnet. The normally extraordinary operating conditions of these magnetic field sensors, in particular with regard to considerable temperature fluctuations from −40° C. to +150° C. and with regard to mechanical vibration and shock loads, require the permanent magnet to be mounted in the magnetic field sensor with extraordinary robustness. Adequate strength of the joint between the heavy permanent magnet and the holder which is provided for this purpose can be achieved, for example, by the contact points being activated by means of a primer, before the application of the UV-curing adhesive. After the UV-curing, additional thermal curing must be carried out for at least three hours at room temperature in order to make it possible to ensure that the joint is of the necessary quality. In order to ensure that the pulse width of the signals which are generated by the Hall probe as it passes over a gear wheel or a similar magnetic field concentrator is as desired, the Hall probe, which is normally in the form of a Hall IC, must be aligned exactly with respect to the permanent magnet, which is preferably in the form of a ring magnet. The disadvantage of the large amount of effort for assembly and manufacture of conventional magnetic field sensors is evident from the large number of work steps, only some of which have been mentioned here, but which must be carried out with very high precision.

Against the background of the problems and disadvantages of the prior art, the invention is based on the object of providing a magnetic field sensor which can be produced with less effort and which is less susceptible to defects.

A magnetic field transmitter of the type mentioned in the introduction is already known from German Utility Model DE 295 16 373 U1, in which an annular permanent magnet is inserted into a sleeve-like housing such that it is aligned, and the Hall probe is then adjusted in a complex manner in particular in the direction of the magnetic axis of the permanent magnet, and is finally fixed to the permanent magnet and to the housing by means of an encapsulation compound.

The International Patent Application WO 03/040659 A1, U.S. Pat. 6,291,990 B1 and German Laid-Open Specification DE 101 46 157 A1 each disclose arrangements with a sensor, in which the Hall probe of a sensor is arranged off a magnetic null axis, which requires the sensor to be positioned very accurately in some way with respect to a rotating component which measurably varies the magnetic flux in the area of the Hall probe of the sensor, as a significant change. The signal from a sensor arrangement such as this must furthermore be of special quality, since the arrangement of the probe in the area which is magnetically not neutral results in a permanent basic signal whose magnitude is highly dependent on the magnetic properties of the area surrounding the sensor, and the signal which is actually to be evaluated is highly dependent on the distance between the sensor and the actual pulse-transmitting marks.

SUMMARY OF THE INVENTION

According to the invention, the object is achieved by a magnetic field sensor of the type described in the introduction, which has the features described in claim 1. The dependent claims contain advantageous developments of the invention.

The attachment of the permanent magnet to the housing offers a number of advantages over the prior art. Since the housing is normally designed to be robust and rigid in order to protect the Hall probe, it is particularly suitable for holding the permanent magnet, which is generally heavy. In this case, it has been found to be particularly advantageous that the shape of the housing can easily be adapted to this object. One major advantage is based on the fact that the permanent magnet need no longer be attached by means of adhesive in a complex manner to a holder which was generally attached to a printed circuit board in the prior art.

Particularly good anchoring and excellent electrical and electronic characteristics of the magnetic field sensor are achieved by the permanent magnet being in the form of a ring or hollow cylinder. This means that the housing can offer an additional interlocking holder for the permanent magnet, in a particularly simple form. With regard to the alignment of the longitudinal axis of the permanent magnet in the direction of the induction axis of the Hall sensor, magnetic field sensor pulses which can be evaluated particularly well are produced in virtually all operating conditions. The induction axis is in this case defined as being oriented at right angles to the electrical field direction of the Hall voltage and to the electrical main current direction in the Hall probe. The best results are achieved when the induction axis coincides with the cylinder longitudinal axis of the permanent magnet.

The housing may be at least partially composed of plastic, which is advantageous in terms of manufacture and with regard to the EMC characteristics. Optimization with regard to the EMC characteristics is achieved in particular by the housing not forming a capacitor (which is susceptible to interference) with the Hall probe or the Hall IC. This can reliably be avoided by the housing being composed completely of plastic. For the preferred field of use of the magnetic field sensor according to the invention, it is particularly expedient for the plastic to be resistant to high temperature.

One advantageous development of the invention provides for the magnetic field sensor to have a plug or a plug socket, which is in the form of a plastic part with extrusion-coated contacts. An embodiment such as this in particular assists the modular configuration of the sensor and of the electrical lines connected to it. In addition, however, this also results in an advantageous embodiment of the magnetic field sensor according to the invention, in which the housing has a closable housing base body, and the plug socket or the plug and the housing base body can be welded to one another, provided that the housing base body is likewise manufactured from an appropriate plastic. The preferred welding methods for these two components are ultrasound welding, vibration welding or rotation welding.

According to the invention, the housing or the housing base body is preferably in the form of an injection-molded component, with the permanent magnet being sprayed into the housing. This allows an excellent connection to be produced between the permanent magnet and the housing, in just one operation. An embodiment such as this furthermore makes it possible for the housing base body to be shaped in the preferred manner as a closable sleeve-like cylinder which is closed at one end, with the Hall probe preferably being arranged in the closed end of the cylinder. This results in particularly robust protection, because of the closed end of the housing, for the Hall probe and in the permanent magnet being held in a particularly robust manner in the housing base body. Particularly if the permanent magnet is in the form of a ring or hollow cylinder, it is recommended that the Hall probe be arranged such that the induction axis extends parallel to the cylinder longitudinal axis of the housing.

According to the invention, the magnetic field sensor can be designed advantageously with respect to operation and convenience for assembly in such a way that the housing base body has an open end opposite the closed end, and the open end of the housing is closed by means of a molding which is in the form of a plug socket or plug. This closure may be in the form of a closure which can be opened for repair or maintenance purposes. Since, from experience, repair occurs only rarely and there is particular interest in the magnetic field sensor according to the invention being sealed, this closure should preferably be adhesively bonded or welded to the housing base body.

The relatively light Hall probe, which is normally in the form of a Hall IC, is preferably attached to a printed circuit board, which is likewise arranged in the housing, and makes electrical contact with it. In order to overcome any negative influence of any oscillations which occur at the Hall probe, it is expedient for the space which remains between the Hall probe and the surrounding housing to be at least partially filled with a damping substance, in particular a gel, in particular with a two-component silicone rubber with a Shore hardness of about A30.

The invention will be explained in more detail in the following text for illustrative purposes, on the basis of one exemplary embodiment and with reference to a drawing, without any restriction to this exemplary embodiment.

BRIEF DESCRIPTION OF THE SEVERAL VIEWS OF THE DRAWINGS

In the drawing:

FIG. 1 shows a longitudinal section through a magnetic field sensor according to the invention.

DETAILED DESCRIPTION OF THE INVENTION

In FIG. 1, a magnetic field sensor 1 according to the invention is provided with the reference symbol 1. Major components of the magnetic field sensor 1 are a housing 2, a Hall probe 3, a permanent magnet 4, with the Hall probe 3 being attached to a printed circuit board 5.

The cylindrical housing 2 has a housing base body 6 and a molding 7, in the form of a closure. The housing 2 has a cylindrical shape, with the housing base body 6 being manufactured as an injection-molded component composed of plastic, and having a closed end 8 and an open end 9. The printed circuit board 5 extends along a cylinder longitudinal axis 10 of the housing 2. In the area of the closed end 8 of the housing 2, the permanent magnet 4, which is in the form of a hollow cylinder, is encapsulated in the housing base body 6.

The Hall probe 3, which is in the form of a Hall IC, is located on an end face 11 of the printed circuit board 5 at the closed end 8 of the housing base body 6. An induction axis 12 of the Hall probe 3 extends in the direction of the cylinder longitudinal axis 10 of the housing 2, which coincides with the longitudinal axis 13 of the permanent magnet 4. The Hall probe 3 extends up to 0.2 mm from that end face 15 of the permanent magnet 4 which is located at the closed end 8 of the housing 2. The space which remains between the Hall probe 3 and the housing base body 6 or the permanent magnet 4 is partially filled with a gel 20, which damps movements between the components.

The molding 7 which closes the housing base body 6 in a sealed form, is attached to the housing base body 6 by means of ultrasound welding. The molding 7 is likewise in the form of a plastic injection-molded component and holds the printed circuit board 5 on one side, while being in the form of a plug socket on the other side, with contacts 30 being encapsulated or extrusion-coated in the molding 7.

The invention claimed is:

1. A magnetic field sensor for measurement of the rotation speed of a rotating transmission component, the sensor comprising:
    a Hall probe having an electrical main current direction, an induction axis and an electrical field direction, the induction axis being at a right angle to the electrical main current direction, the electrical field direction being at a right angle to the electrical main current direction and at a right angle to the induction axis, the Hall probe located in a housing which surrounds the Hall probe, the housing at least partially comprising plastic, the housing comprising an injection molded component, wherein;
    the housing comprises a closable housing base body having a cylinder which is closed at one end like a sleeve;
    the Hall probe is located in the closed end; and
    the housing base body comprises an open end opposite to the closed end, and the open end of the housing is closed by means of a molding which is in the form of a plug socket or plug; and
    a permanent magnet sprayed into the housing and attached to an inside surface of the housing, the permanent magnet comprising a ring or hollow cylinder having a longitudinal axis aligned with the induction axis of the Hall sensor, the permanent magnet having a magnetic field, the Hall probe located in an area, of influence of the magnetic field of the permanent magnet.

2. The magnetic field sensor according to claim 1, wherein the plastic is resistant to high temperature.

3. The magnetic field sensor according to claim 1, wherein the magnetic field sensor includes a plug or a plug socket comprising a plastic part with extrusion-coated contacts.

4. The magnetic field sensor according to claim 3, wherein the housing includes a closable housing base body and the plug socket and the housing base body are welded to one another.

5. The magnetic field sensor as claimed in claim 4, wherein the plug socket and the housing base body are connected to one another by at least one of ultrasound welding, vibration welding and rotation welding.

6. The magnetic field sensor according to claim 1, wherein the induction axis of the Hall probe extends parallel to the cylinder longitudinal axis of the housing.

7. The magnetic field sensor according to claim 1, wherein the Hall probe is attached to a printed circuit board and wherein the Hall probe is in electrical contact with the printed circuit board.

8. The magnetic field sensor according to claim 1, wherein the space between the Hall probe and the surrounding housing is at least partially filled with a damping substance.

9. The magnetic field sensor according to claim 8, wherein the substance is a gel.

10. The magnetic field sensor according to claim 8, wherein the substance is a gel with a two-component silicone rubber and with a Shore hardness of about A30.

\* \* \* \* \*